United States Patent
Meiser et al.

(10) Patent No.: US 11,835,309 B2
(45) Date of Patent: Dec. 5, 2023

(54) TUBE PLATE, HEAT EXCHANGER AND METHOD FOR PRODUCING A HEAT EXCHANGER

(71) Applicant: MAHLE International GmbH, Stuttgart (DE)

(72) Inventors: Alexander Meiser, Stuttgart (DE); Marco Renz, Esslingen (DE)

(73) Assignee: Mahle International GmbH, Stuttgart (DE)

( * ) Notice: Subject to any disclaimer, the term of this patent is extended or adjusted under 35 U.S.C. 154(b) by 0 days.

(21) Appl. No.: 17/496,744

(22) Filed: Oct. 7, 2021

(65) Prior Publication Data

US 2022/0113096 A1 Apr. 14, 2022

(30) Foreign Application Priority Data

Oct. 8, 2020 (DE) ...................... 10 2020 212 713.1

(51) Int. Cl.
*F28F 9/02* (2006.01)

(52) U.S. Cl.
CPC .......... *F28F 9/0256* (2013.01); *F28F 9/0253* (2013.01)

(58) Field of Classification Search
CPC ........ F28F 9/0138; F28F 9/0256; F28F 9/013; F28F 2009/029; F28F 9/0253
See application file for complete search history.

(56) References Cited

U.S. PATENT DOCUMENTS

| 4,582,127 | A | * | 4/1986 | Moranne | F28F 9/0226 165/83 |
| 5,492,172 | A | * | 2/1996 | Laveran | F28F 9/0224 165/173 |
| 6,082,439 | A | * | 7/2000 | Kato | F28F 9/0226 165/173 |
| 8,978,746 | B2 | | 3/2015 | Cornell et al. | |
| 9,429,372 | B2 | | 8/2016 | Hirsch et al. | |
| 2001/0054496 | A1 | * | 12/2001 | Kajikawa | F28F 21/084 165/134.1 |
| 2012/0199332 | A1 | | 8/2012 | Cornell et al. | |
| 2020/0166277 | A1 | | 5/2020 | Foerster et al. | |

FOREIGN PATENT DOCUMENTS

| DE | 102011079091 A1 | 1/2013 |
| DE | 102015205605 A1 | 9/2016 |

* cited by examiner

*Primary Examiner* — Jon T. Schermerhorn, Jr.
(74) *Attorney, Agent, or Firm* — Ewers IP Law PLLC; Falk Ewers

(57) ABSTRACT

A tube plate for a heat exchanger has a base body in which at least two apertures are formed for receiving respectively a tube body. In addition, the tube plate includes a groove, likewise formed in the base body, with which the two apertures are connected with one another.

16 Claims, 2 Drawing Sheets

TUBE PLATE, HEAT EXCHANGER AND METHOD FOR PRODUCING A HEAT EXCHANGER

CROSS REFERENCE TO RELATED APPLICATIONS

This application claims priority to Chinese patent application DE 10 2020 212 713.1, filed Oct. 8, 2020, the entire content of which is incorporated herein by reference.

TECHNICAL FIELD

The present disclosure relates to a tube plate for a heat exchanger and a heat exchanger with such a tube plate. The disclosure further relates to a method for producing such a heat exchanger.

BACKGROUND

For some time, heat exchangers have been embodied with tube plates which are formed with apertures for receiving tube bodies. Here, in the production of such heat exchangers, said tube bodies are usually inserted into the apertures and are then soldered with the tube plates. Such a tube plate typically serves to keep the tube bodies at a distance relative to one another. In addition, such tube plates can delimit a fluid collector or a fluid distributor, from which a fluid is able to be distributed to tube body interiors of the tube bodies or respectively is able to be collected. For this, it is necessary that during the soldering a joint between the aperture of the tube plate and the tube body which is received in this aperture is closed in a fluid-tight manner, for which reason a complete—i.e. at least in part completely surrounding the tube body in the joint—filling of the joint with a solder must be guaranteed. In order to ensure that the solder fills the entire joint as much as possible, a flux paste is usually applied manually before the soldering process with a dosing gun, with which the flow characteristics of the solder are improved in such a way that the solder, after a heating above its solidus temperature can flow in a fluid state into the joint in an improved manner.

It proves to be disadvantageous here that owing to the tube bodies which are received in the apertures, in particular in the case of multi-row systems, an accessibility of the joints is impaired. This has the result that a uniform applying of the flux, as is necessary for fluid-tight soldering, cannot be guaranteed or can only be guaranteed with considerable extra effort.

SUMMARY

It is therefore an object of the present disclosure to provide new ways for tube plates for a heat exchanger and for heat exchangers with such a tube plate and for methods for producing such a heat exchanger—in particular to eliminate the above-mentioned disadvantage.

This problem is solved by a tube plate, by a heat exchanger, and a method for producing a heat exchanger as described herein.

A general idea of the disclosure is, accordingly, to configure a tube plate for a heat exchanger such that two apertures of the tube plate, arranged to respectively receive a tube body, are connected with one another with a groove which is also formed in the base body.

Advantageously, this permits—with a materially bonded joining of tube bodies received in the apertures with the tube plate—a joining means or respectively a joining agent, therefore typically a solder or respectively a flux, to be able to be distributed with the groove of the tube plate uniformly onto the apertures. This means that joints which are present between each aperture and the tube body received in the respective aperture can be uniformly wetted with joining means or respectively joining agent, even if one of the joints is at least in part poorly accessible, as the joining means or respectively joining agent can flow via the groove also to such poorly accessible sites of the joint.

A tube plate according to the disclosure for a heat exchanger, which is expediently able to be used for a motor vehicle, comprises a base body. The base body is typically configured in a substantially flat manner. In the base body at least two apertures are formed for receiving respectively a tube body. The two apertures of the tube plate are connected with one another with a groove, likewise formed in the base body. As already explained above, this groove advantageously permits that by a joining means or respectively joining agent, two joints of which respectively one is present between in each case one of the apertures and the tube body, received in the respective aperture, can be filled particularly well with the joining means, even if one or both of the joints is/are at least partly accessible with difficulty.

In an advantageous further development of the tube plate, the groove has two opposite groove ends, one of which respectively opens into one of the two apertures. Advantageously, the joining means or respectively the joining agent can thus flow particularly well via the groove over from the one aperture to the other aperture.

According to a further development of the tube plate, the base body is arranged in a base plane. The groove is formed so as to be open along an extent direction away from the base body. This extent direction runs here perpendicularly to the base plane. Such a groove can advantageously be produced at a particularly favourable cost with a shaping process.

According to a further development of the tube plate, the two apertures form respectively a receiving space for a tube body which extends along the extent direction. The two receiving spaces are connected with one another in a communicating manner with the groove. This advantageously permits a quantity of joining means or respectively joining agent to be able to be distributed particularly uniformly to the two apertures or respectively receiving spaces with a groove, for the materially bonded joining of tube bodies which are received in the receiving spaces.

A further advantageous development of the tube plate makes provision that the groove is embodied in an elongated manner and extends along a longitudinal direction. This longitudinal direction runs orthogonally to the extent direction of the groove. Such a groove proves to be particularly suitable under fluidic aspects.

In a further development of the tube plate, the groove has a rounded shaping sectioned crosswise to the longitudinal direction. Advantageously, such a groove is able to be produced in a particularly simple manner.

According to a further development of the tube plate, the groove has a groove depth of 0.5 mm to 2 mm measured in its extent direction towards the base body of the tube plate. Alternatively or additionally, the groove has a groove width of 2 mm to 8 mm measured perpendicularly to its extent direction and perpendicularly to its longitudinal direction. With such a groove, the joining means or respectively the joining agent can be distributed to the apertures particularly well.

In a further advantageous further development of the tube plate, to receive (respectively) a tube body at least one of the apertures, in particular each of the apertures, is configured in an elongated manner extending along the longitudinal direction. Expediently, such a tube body which is able to be received in the elongated aperture is configured as a flat tube. Alternatively or additionally, at least one of the apertures, typically each of the apertures, is widened in a groove-like manner at both ends in longitudinal direction. This has a beneficial effect on the desired complete filling of the joints with joining means.

According to a further development of the tube plate, the base body has several apertures, formed substantially in an identical manner. These substantially identically formed apertures are arranged along the longitudinal direction, in particular equidistant to one another, in a line. Here, the base body has several substantially identically configured grooves, each of which is arranged between two adjacent apertures, such that apertures and grooves are arranged alternately in the line. Advantageously therefore with a grooves a joining means or respectively a joining agent can be distributed to all apertures—which are then fluidically connected in series via the grooves—of the entire line in a uniform manner.

According to a further advantageous development of the tube plate, the base body comprises several lines of apertures and grooves. These several lines are configured in a substantially identical manner and are arranged perpendicularly to the extent direction of the grooves and in an angled manner to their longitudinal direction along a transverse direction of the tube plate at a distance from one another. Typically, the lines are arranged perpendicularly to the extent direction and perpendicularly to the longitudinal direction along the transverse direction at a distance, in particularly equidistant, with respect to one another. With the grooves here advantageously even in the case of the considerably impaired accessibility of the apertures or respectively of the joints, due to the multi-line configuration of the base body, between respectively one of the apertures and a tube body received in one of the apertures, the desirable uniform distribution of the joining means or respectively joining agent is ensured.

In a further advantageous development of the tube plate, at least one of the apertures, typically each of the apertures, is configured as a passage. Facing away from the groove, such a passage has a passage collar which partially delimits the receiving space of the respective aperture which is configured as a passage. Advantageously, a particularly large joining face of the aperture is thus achieved which, together with the tube body, which is received in the aperture, delimits the joint. Such an enlarged joining surface has an advantageous effect on a strength of the materially bonded connection, formed in the joint, between the tube body and the base body.

According to a further development of the tube plate, the base body is configured substantially in a flat manner apart from the apertures and the groove. Such a base body is advantageously able to be produced at a particularly favorable cost from a flat semi-finished product with a punching and embossing method.

In addition, the disclosure relates to a heat exchanger which is expediently arranged for use in a motor vehicle. The heat exchanger comprises at least one tube plate according to the disclosure, as described above. In addition, the heat exchanger comprises a number of tube bodies, which corresponds to a number of apertures of the tube plate. Here, respectively one of these tube bodies is received and fastened in respectively one of the apertures of the tube plate, so that a fluid-tight contact is formed between the tube bodies and the respective apertures. The advantages of the tube plate according to the disclosure which are indicated above extend in an analogous manner also to the heat exchanger according to the disclosure having such a tube plate.

Furthermore, the disclosure relates to a method for producing a heat exchanger according to the disclosure in accordance with the above description. The method comprises an action a), in which a tube plate according to the disclosure is provided in accordance with the above description. In addition, the method comprises an action b) according to which at least two tube bodies are arranged in such a way that respectively one of the tube bodies is received in respectively one of the apertures of the tube plate, forming a joint. In addition, the method comprises an action c) according to which a materially bonded joining of the tube bodies with the tube plate takes place. Here, in action c) a joining means and—alternatively or additionally—a joining agent is distributed uniformly onto the joints with the groove of the tube plate. The previously indicated advantages of the heat exchanger according to the disclosure with a tube plate according to the disclosure also extend to the method according to the disclosure for producing such a heat exchanger.

According to an advantageous development of the method, the materially bonded joining according to action c) takes place with soldering. Here, a solder is used as joining means and a flux is used as joining agent. This advantageously permits a particularly fluid-tight connection between the tube bodies and the tube plate.

Further important features and advantages of the disclosure will emerge from the drawings and from the associated figure description with the aid of the drawings.

It shall be understood that the features mentioned above and to be explained further below are able to be used not only in the respectively indicated combination, but also in other combinations or in isolation, without departing form the scope of the present disclosure.

Exemplary embodiments of the disclosure are presented in the drawings and are explained more closely in the following description, wherein the same reference numbers refer to identical or similar or functionally identical components.

BRIEF DESCRIPTION OF THE DRAWINGS

The disclosure will now be described with reference to the drawings wherein.

DESCRIPTION OF EXEMPLARY EMBODIMENTS

Figure 1:
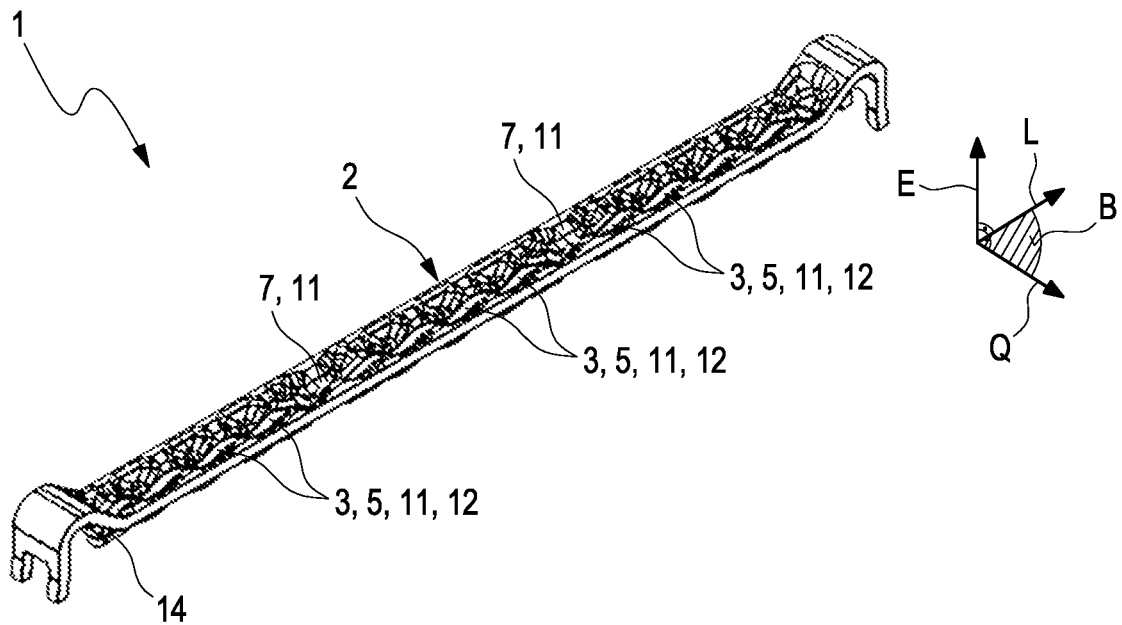
FIG. 1 shows, in a perspective illustration, a tube plate for a heat exchanger according to an exemplary embodiment of the disclosure.

In FIG. 1 a tube plate 1 according to an exemplary embodiment of the disclosure, for a heat exchanger 16, is shown in a perspective illustration. Such a heat exchanger 16 is expediently able to be used for a motor vehicle. The tube plate 1 has a base body 2 which in accordance with the example which is shown is configured in a substantially flat manner. At least two apertures 3 for receiving respectively a tube body 4 are formed in the base body 2. Such tube bodies are not shown in FIG. 1 for reasons of clarity. The at least two apertures 3 are connected with one another with a groove 7, which is likewise formed in the base body 2. In the example of FIG. 1, three such apertures are present, wherein respectively two adjacent apertures 3 are connected with one another with a groove 7. This means that in the example of FIG. 1, two grooves 7 are present.

Figure 2:
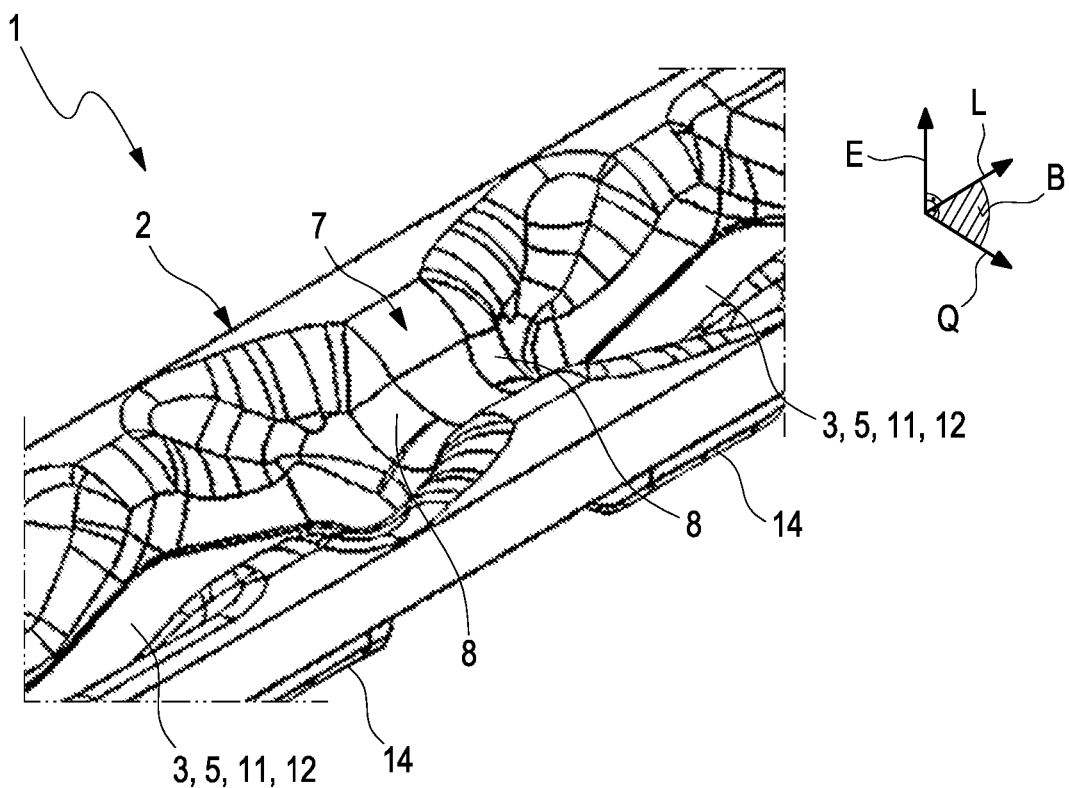
FIG. 2 shows a detail of the exemplary embodiment shown in FIG. 1.

In FIG. 2, the exemplary embodiment shown in FIG. 1 is shown in a perspective detail illustration. It can be seen that the groove 7 has two groove ends 8 lying opposite one another. Respectively one of the groove ends 8 opens into in each case one of the at least two apertures 3.

In FIGS. 1 and 2, it can be seen in addition that the base body 2 is arranged in a base plane B. The groove 7 is configured so as to be open along an extent direction E away from the base body 2. Here, the extent direction E extends perpendicularly to the base plane B of the base body 2.

Figure 3:
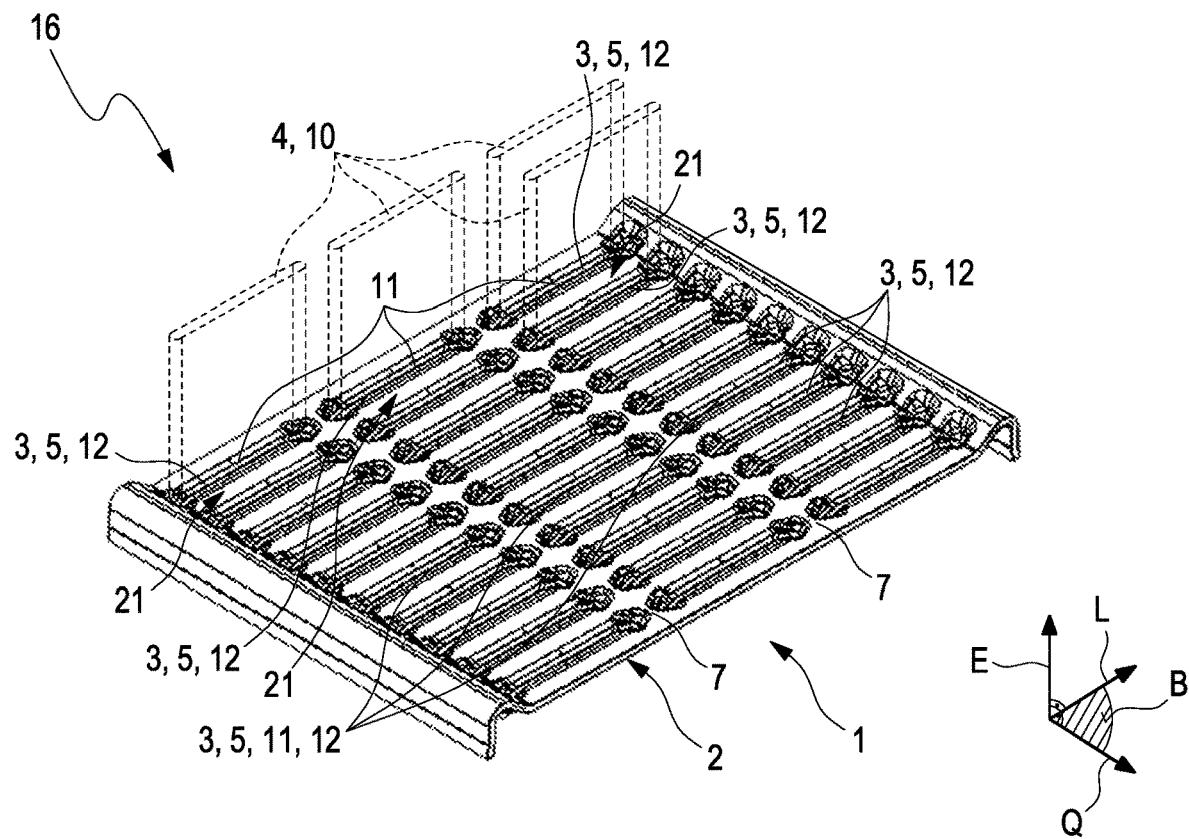
FIG. 3 shows a tube plate for a heat exchanger, in a perspective illustration, according to a further exemplary embodiment of the disclosure.

In FIG. 3, a tube plate according to a further exemplary embodiment of the disclosure is shown in a perspective illustration. It can be seen that the apertures 3 form respectively a receiving space 5 for a tube body 4, which extends along the extent direction E. Here, the at least two receiving spaces 5 communicate with one another fluidically with the groove 7. In the exemplary embodiment shown in FIG. 3 it can be seen that in each case two adjacent receiving spaces 5 communicate fluidically with a groove 7 in each case.

FIGS. 1 to 3 illustrate in addition that the groove 7 is configured in an elongated manner and extends along a longitudinal direction L. The longitudinal direction L runs orthogonally to the extent direction E of the groove 7. The groove 7 has a rounded shaping, sectioned crosswise to its longitudinal direction L. The groove 7 has a groove depth of 0.5 mm to 2 mm, 1.5 mm in the example, measured in extent direction E towards the base body 2 of the tube plate 1. In the examples which are shown, the groove 7 has a groove width of 2 mm to 8 mm, 6 mm in the example, measured perpendicularly to the extent direction E and perpendicularly to the longitudinal direction L.

In FIG. 3, it is shown in addition that to receive respectively a tube body 4, which is configured here as flat tube 10, at least one of the apertures 3—each of the apertures 3 in the example which is shown—is configured extending in an elongated manner along the longitudinal direction L. Here, the at least one aperture 3—all apertures 3 in the example which is shown—is widened in a groove-like manner in longitudinal direction L at both ends. It can be seen furthermore that the base body 2 has several apertures 3 which are configured substantially identically. In the exemplary embodiment which is shown, all the apertures 3 are configured in a substantially identical manner. The substantially identically configured apertures 3 are arranged spaced apart from one another in a line 11 along the longitudinal direction L. The apertures 3, arranged in the line 11, are arranged equidistantly to one another along the longitudinal direction L. The base body 2 has several substantially identically configured grooves 7. In each case one of these grooves 7 is arranged between two adjacent apertures 3, so that in the line 11 apertures 3 and grooves 7 are arranged alternately.

From the example of FIG. 3, it can be seen in addition that the base body 2 comprises several lines 11 of apertures 3 and grooves 7. The lines 11 are configured here in a substantially identical manner. The lines 11 are arranged perpendicularly to the extent direction E and in an angled manner—perpendicularly in the example which is shown—to the longitudinal direction L along a transverse direction Q of the tube plate 1 at a distance from one another. In the exemplary embodiment shown in FIG. 3, the lines 11 are arranged at a distance equidistant to one another along the transverse direction Q of the tube plate 1. The longitudinal direction L and the transverse direction Q span jointly the base plane B.

FIGS. 1 to 3 show, furthermore, that at least one of the apertures 3—all the apertures 3 in the exemplary embodiment which are shown—is/are configured as passage 12. Here, such a passage 12 has a passage collar 14 facing away from the groove 7. The passage collar 14 of the passage 12 partially delimits the receiving space 5 of the respective aperture 3 which is configured as passage 12. In the examples which are shown, the base body 2 is configured as a shaped sheet metal part which has a sheet metal thickness of 2 mm measured along the extent direction E—therefore perpendicularly to the base plane B. It can be seen furthermore that the base body 2 is configured to be substantially planar apart from the apertures 3 and the groove 7.

FIG. 3 illustrates in addition by way of example a heat exchanger 16 according to the disclosure, which can be comprised by a motor vehicle. Accordingly, the heat exchanger 16 has at least one tube plate 1 according to the disclosure, such as one which is shown in FIGS. 1 to 3 and is already described above. The heat exchanger 16 comprises, in addition, a number of tube bodies 4 which corresponds to a number of apertures 3 of the tube plate 1. For reasons of clarity, only four tube bodies 4 are shown here by way of example in FIG. 3. In the heat exchanger 16 respectively one of the tube bodies 4 is received and fastened in respectively one of the apertures 3 of the tube plate 1, so that a fluid-tight contact is formed between the tube bodies 4 and the respective apertures 3.

Figure 4:
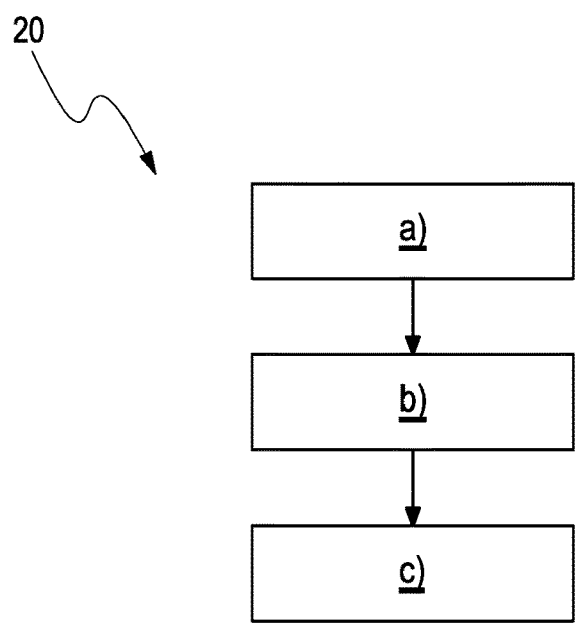
FIG. 4 shows a flow chart of a method for producing a heat exchanger according to an exemplary embodiment of the disclosure.

FIG. 4 illustrates in a flow chart by way of example a method 20 according to an exemplary embodiment of the disclosure for producing a heat exchanger 16 according to an exemplary embodiment of the disclosure. The method 20 comprises an action a), according to which a tube plate 1, like one such shown in FIGS. 1 to 3 and already described above, is provided. The method 20 furthermore comprises a further action b) according to which at least two tube bodies 4 are arranged in such a way that respectively one of the tube bodies 4 is received in respectively one of the apertures 3 with the formation of a joint 21 (cf. FIG. 3). Furthermore, the method 20 comprises an action c), according to which the tube bodies 4 are joined with the tube plate 1 in a materially bonded manner. Here, in action c) a joining means and—alternatively or additionally—a joining agent is distributed uniformly onto the joints 21 with the groove 7 of the tube plate 1. The materially bonded joining according to action c) can take place with soldering, wherein then a solder is used as joining means and a flux is used as joining agent.

Alternatively, the materially bonded joining according to action c) can take place with gluing, wherein then an adhesive is used as joining means.

It is understood that the foregoing description is that of the exemplary embodiments of the disclosure and that various changes and modifications may be made thereto without departing from the spirit and scope of the disclosure as defined in the appended claims.

What is claimed is:

1. A tube plate for a heat exchanger for a motor vehicle, the tube plate comprising:
    a base body configured to be substantially flat, in which at least two apertures are formed for receiving respectively a tube body, wherein the at least two apertures are connected with one another with a groove which is likewise formed in the base body, wherein the two apertures form respectively a receiving space for a tube body, and wherein the two receiving spaces communicate fluidically with one another via the groove to uniformly distribute at least one of a joining means and a joining agent onto the two apertures.

2. The tube plate according to claim 1, wherein the groove has two groove ends lying opposite one another, of which respectively one opens into one of the two apertures.

3. The tube plate according to claim 1, wherein:
the base body is arranged in a base plane,
the groove is configured to be open along an extent direction away from the base body, and
the extent direction extends perpendicularly to the base plane.

4. The tube plate according to claim 3, wherein:
the receiving space for the tube body extends along the extent direction.

5. The tube plate according to claim 3, wherein the groove is configured in an elongated manner and extends along a longitudinal direction which runs orthogonally to the extent direction.

6. The tube plate according to claim 5, wherein the groove has a rounded shaping sectioned crosswise to its longitudinal direction.

7. The tube plate according to claim 5, wherein:
the groove has a groove depth of 0.5 mm to 2 mm measured in extent direction towards the base body of the tube plate, and/or
the groove has a groove width of 2 mm to 8 mm measured perpendicularly to the extent direction and perpendicularly to the longitudinal direction.

8. The tube plate according to claim 5, wherein:
to receive a tube body, typically configured as flat tube, at least one of the apertures, typically each aperture, is configured extending in an elongated manner along the longitudinal direction, and/or
the at least one aperture, typically each aperture, is widened in a groove-like manner in longitudinal direction at both ends.

9. The tube plate according to claim 5, wherein:
the base body has several apertures configured in a substantially identical manner, which are arranged in a line typically equidistant to one another, along the longitudinal direction, and the base body has several substantially identically configured grooves, each one of which is arranged between two adjacent apertures, such that in the line apertures and grooves are arranged alternately.

10. The tube plate according to claim 9, wherein the base body comprises several lines of apertures and grooves, which are configured in a substantially identical manner and which are arranged perpendicularly to the extent direction and in an angled manner, in particular perpendicularly, to the longitudinal direction along a transverse direction of the tube plate at a distance, in particular equidistant, to one another.

11. The tube plate according to claim 1, wherein:
at least one of the apertures, typically each aperture, is configured as a passage facing away from the groove, and
the passage has a passage collar, which partially delimits the receiving space of the respective aperture which is configured as passage.

12. The tube plate according to claim 1, wherein the base body is configured in a substantially flat manner apart from the apertures and the groove.

13. The tube plate according to claim 1, wherein the joining means is a solder and the joining agent is a flux.

14. A heat exchanger, in particular for a motor vehicle, the heat exchanger comprising:
at least one tube plate according to claim 1; and
a number of tube bodies which corresponds to a number of apertures of the tube plate,
wherein respectively one of the tube bodies is received and fastened in respectively one of the apertures of the tube plate, such that a fluid-tight contact is formed between the tube bodies and the respective apertures.

15. A method for producing a heat exchanger according to claim 14, the method comprising:
(a) providing a tube plate;
(b) arranging at least two tube bodies such that respectively one of the tube bodies is received in respectively one of the apertures with the formation of a joint;
(c) materially bonded joining of the tube bodies with the tube plate.

16. The method according to claim 15, wherein the materially bonded joining according to step (c) takes place with soldering.

* * * * *